(12) United States Patent
Kobayashi

(10) Patent No.: US 9,922,319 B2
(45) Date of Patent: Mar. 20, 2018

(54) CREDIT CARD INFORMATION PROCESSING SYSTEM, CREDIT CARD INFORMATION PROCESSING METHOD, ORDER INFORMATION RECEIVING DEVICE, CREDIT CARD TRANSACTION DEVICE, PROGRAM, AND INFORMATION RECORDING MEDIUM

(75) Inventor: Yoshinori Kobayashi, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 514 days.

(21) Appl. No.: 14/129,284

(22) PCT Filed: May 29, 2012

(86) PCT No.: PCT/JP2012/063801
§ 371 (c)(1),
(2), (4) Date: Dec. 25, 2013

(87) PCT Pub. No.: WO2013/001967
PCT Pub. Date: Jan. 3, 2013

(65) Prior Publication Data
US 2014/0129360 A1    May 8, 2014

(30) Foreign Application Priority Data
Jun. 30, 2011  (JP) ................................ 2011-146203

(51) Int. Cl.
*G06Q 20/00* (2012.01)
*G06Q 20/34* (2012.01)
(Continued)

(52) U.S. Cl.
CPC ............. *G06Q 20/34* (2013.01); *G06Q 20/02* (2013.01); *G06Q 20/12* (2013.01); *G06Q 20/24* (2013.01);
(Continued)

(58) Field of Classification Search
CPC .......................... G06Q 20/3672; G06Q 20/202
(Continued)

(56) References Cited

U.S. PATENT DOCUMENTS

| 7,006,993 B1 | 2/2006 | Cheong et al. |
| 2001/0029485 A1* | 10/2001 | Brody .................... G06Q 20/00 705/39 |

(Continued)

FOREIGN PATENT DOCUMENTS

| JP | 2002-298055 A | 10/2002 |
| JP | 2003-317021 A | 11/2003 |

(Continued)

OTHER PUBLICATIONS

The partial translation of OA for corresponding Patent Application No. KR10-2014-7002437 dated Aug. 6, 2015.

(Continued)

*Primary Examiner* — A Hunter Wilder
(74) *Attorney, Agent, or Firm* — HEA Law PLLC

(57) ABSTRACT

A seller's workload of managing credit card information can be reduced without changing convenience for an orderer and the seller in a transaction using a credit card. A virtual mall server (3) and a credit card server (5) share conversion information for obtaining, from actual data of the credit card, corresponding dummy data of the credit card. The virtual mall server (3) obtains, based on the conversion information, the corresponding dummy data from the actual data of the credit card to be used for a settlement of the order information, and sends the obtained dummy data to a shop terminal as data of the credit card to be used for the settlement of the order information. Upon receiving, from the shop terminal, a predetermined card processing request based on the dummy data, the credit card server (5) obtains, based on the conversion information, the corresponding (Continued)

actual data from the dummy data of the credit card, and performs the predetermined card processing based on the obtained actual data of the credit card.

8 Claims, 12 Drawing Sheets

(51) Int. Cl.
    *G06Q 20/24*     (2012.01)
    *G06Q 20/12*     (2012.01)
    *G06Q 20/38*     (2012.01)
    *G06Q 20/02*     (2012.01)
    *G06Q 20/20*     (2012.01)

(52) U.S. Cl.
    CPC ......... *G06Q 20/385* (2013.01); *G06Q 20/202* (2013.01)

(58) Field of Classification Search
    USPC .............................................. 705/21, 65, 66
    See application file for complete search history.

(56) References Cited

U.S. PATENT DOCUMENTS

| | | | |
|---|---|---|---|
| 2003/0126094 | A1 | 7/2003 | Fisher |
| 2004/0254848 | A1* | 12/2004 | Golan ................... G06Q 20/04 705/50 |
| 2007/0192245 | A1* | 8/2007 | Fisher ................... G06Q 20/02 705/39 |
| 2009/0134217 | A1* | 5/2009 | Flitcroft ................. G06Q 20/00 235/380 |
| 2010/0010918 | A1* | 1/2010 | Hunt ..................... G06Q 20/102 705/26.1 |
| 2011/0153498 | A1 | 6/2011 | Makhotin et al. |

FOREIGN PATENT DOCUMENTS

| | | |
|---|---|---|
| JP | 2009-026116 A | 2/2009 |
| JP | 2010-277538 A | 12/2010 |
| KR | 20080044029 A | 5/2008 |

OTHER PUBLICATIONS

English Translation of Written Opinion of the International Searching Authority for PCT/JP2012/063801 accompanied with PCT/IB/373 and PCT/IB/338 dated Jan. 16, 2014, acting as concise explanation of previously submitted reference(s).
International Search Report for PCT/JP2012/063801 dated Jul. 31, 2012.
Office Action dated Jul. 26, 2016 for corresponding Korean application No. 10-2014-7002437.
Partial translation of OA for corresponding Korean application No. 10-2014-7002437.

\* cited by examiner

FIG.2
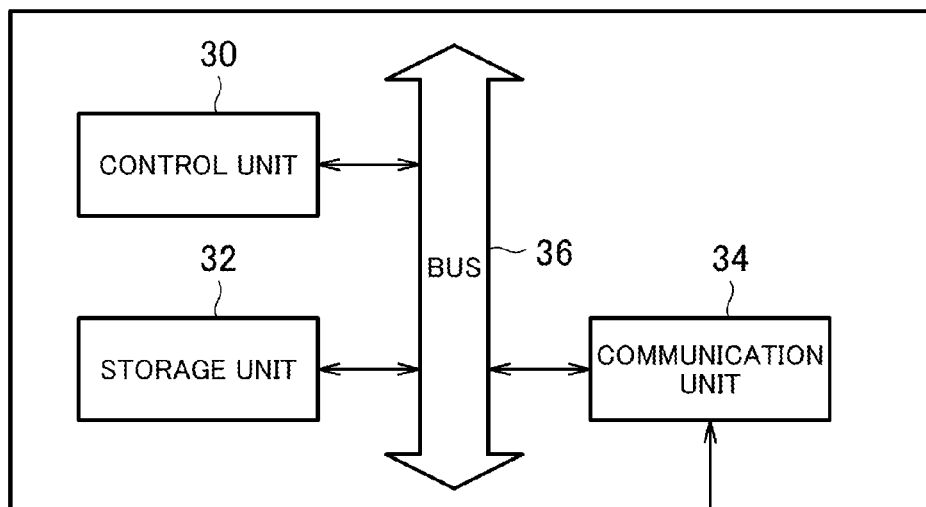
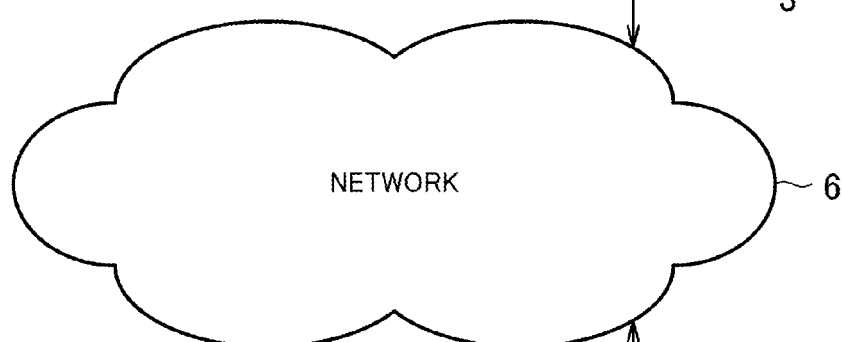
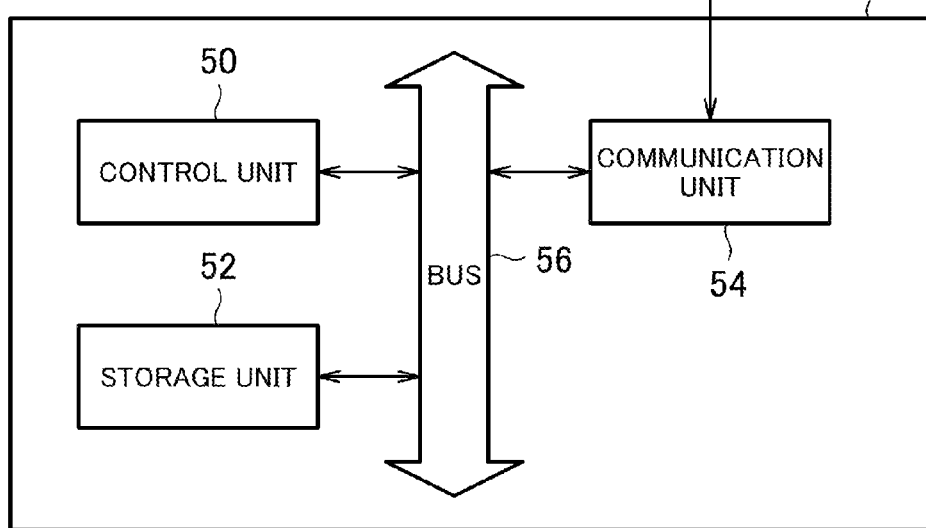

FIG.3

| USER ID | PASSWORD | E-MAIL ADDRESS | CREDIT CARD INFORMATION | |
|---------|----------|----------------|---|---|
| U001 | **** | U001@a.com | NUMBER | 1111-2222-3333-4444 |
| | | | CARDHOLDER | AAAA |
| | | | EXPIRATION DATE | 06/12 |
| U002 | **** | U002@a.com | NUMBER | — |
| | | | CARDHOLDER | — |
| | | | EXPIRATION DATE | — |
| | | | | |

FIG.4

| CREDIT CARD ACTUAL NUMBER | CREDIT CARD DUMMY NUMBER | USER ID | SHOP ID | INVALID FLAG |
|---|---|---|---|---|
| 1111-2222-3333-4444 | 0234-1234-1234-1234 | U001 | S001 | F (VALID) |
| 5555-6666-7777-8888 | 0678-5678-5678-5678 | U002 | S001 | T (INVALID) |
| 9999-1111-2222-3333 | 0123-9123-9123-9123 | U003 | S002 | F (VALID) |
| | | | | |

FIG.5

| CREDIT CARD ACTUAL NUMBER | CREDIT LINE | AVAILABLE AMOUNTS | CARDHOLDER | EXPIRATION DATE | INVALID FLAG |
|---|---|---|---|---|---|
| 1111-2222-3333-4444 | 500,000 YEN | 350,000 YEN | AAAA | 06/12 | F (VALID) |
| 5555-6666-7777-8888 | 300,000 YEN | 200,000 YEN | BBBB | 07/11 | F (VALID) |
| 9999-1111-2222-3333 | 400,000 YEN | 400,000 YEN | CCCC | 08/12 | T (INVALID) |

FIG.6

| CREDIT CARD DUMMY NUMBER | EXPIRATION DATE | USAGE HISTORY | |
| --- | --- | --- | --- |
| | | DATE OF USE | USED AMOUNT |
| 0234-1234-1234-1234 | 07/11 | 2011.6.1 | 50,000 YEN |
| | | 2011.6.5 | 50,000 YEN |
| | | 2011.6.10 | 50,000 YEN |
| 0678-5678-5678-5678 | 07/11 | 2011.6.10 | 100,000 YEN |
| | | | |

| DUMMY NUMBER (CANDIDATE) | UTILIZATION AVAILABILITY FLAG |
|---|---|
| 0234-1234-1234-1234 | F (NOT AVAILABLE) |
| 0678-5678-5678-5678 | F (NOT AVAILABLE) |
| 0111-2222-1111-2222 | T (AVAILABLE) |
| 0111-2222-1111-2223 | T (AVAILABLE) |
| | |

(B)

| DUMMY NUMBER (CANDIDATE) |
|---|
| 0111-2222-1111-2222 |
| 0111-2222-1111-2223 |
| |

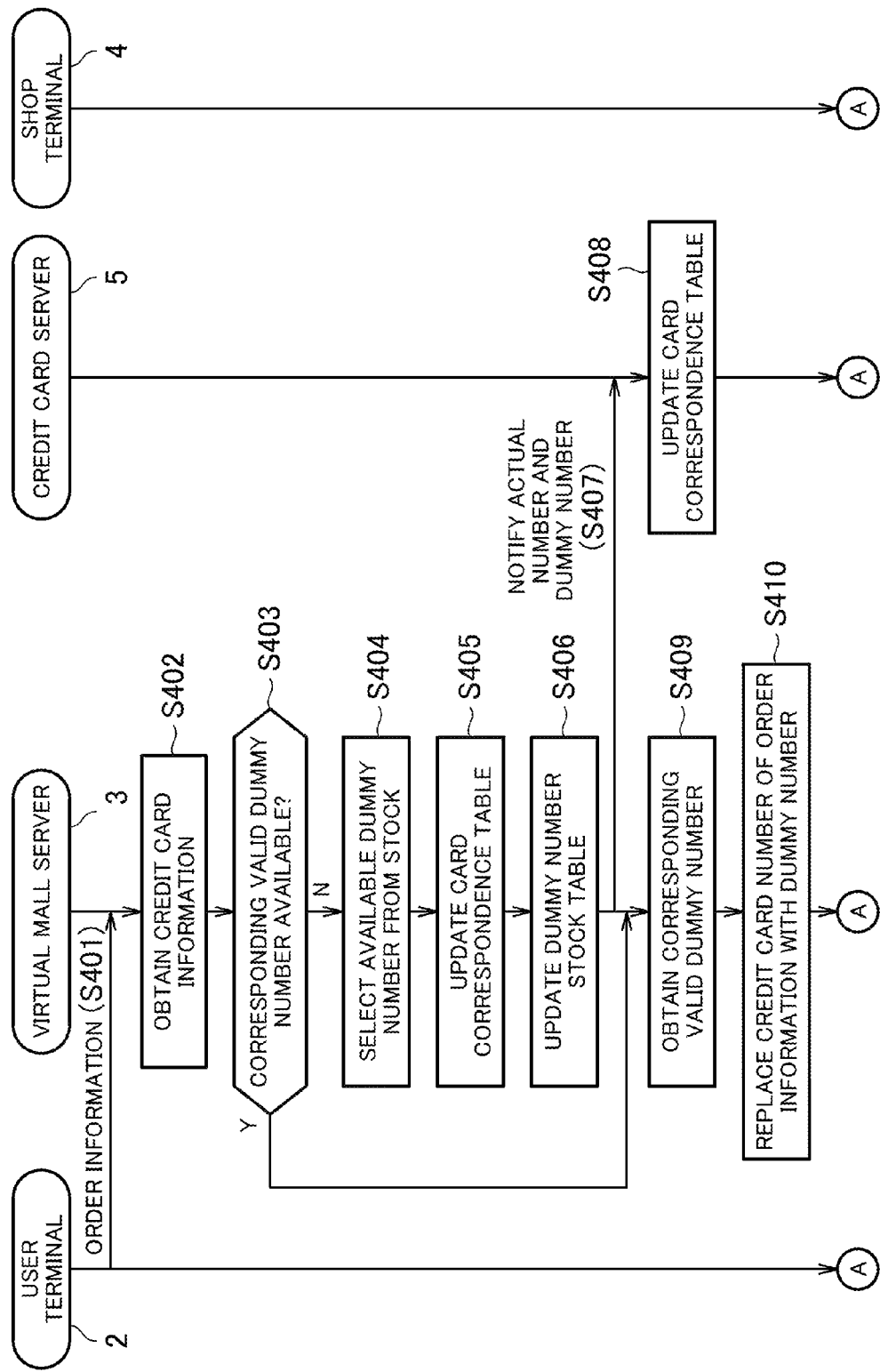

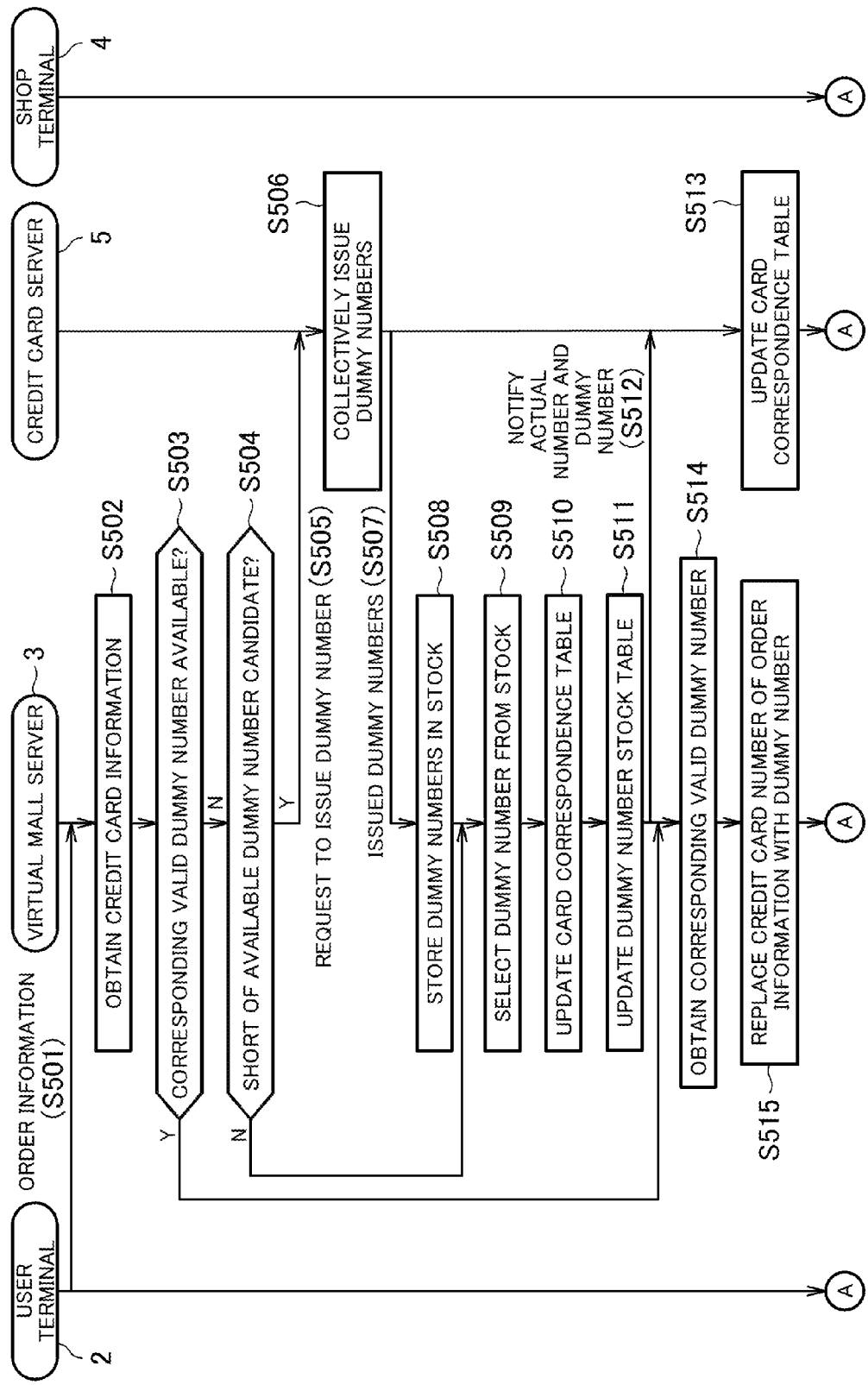

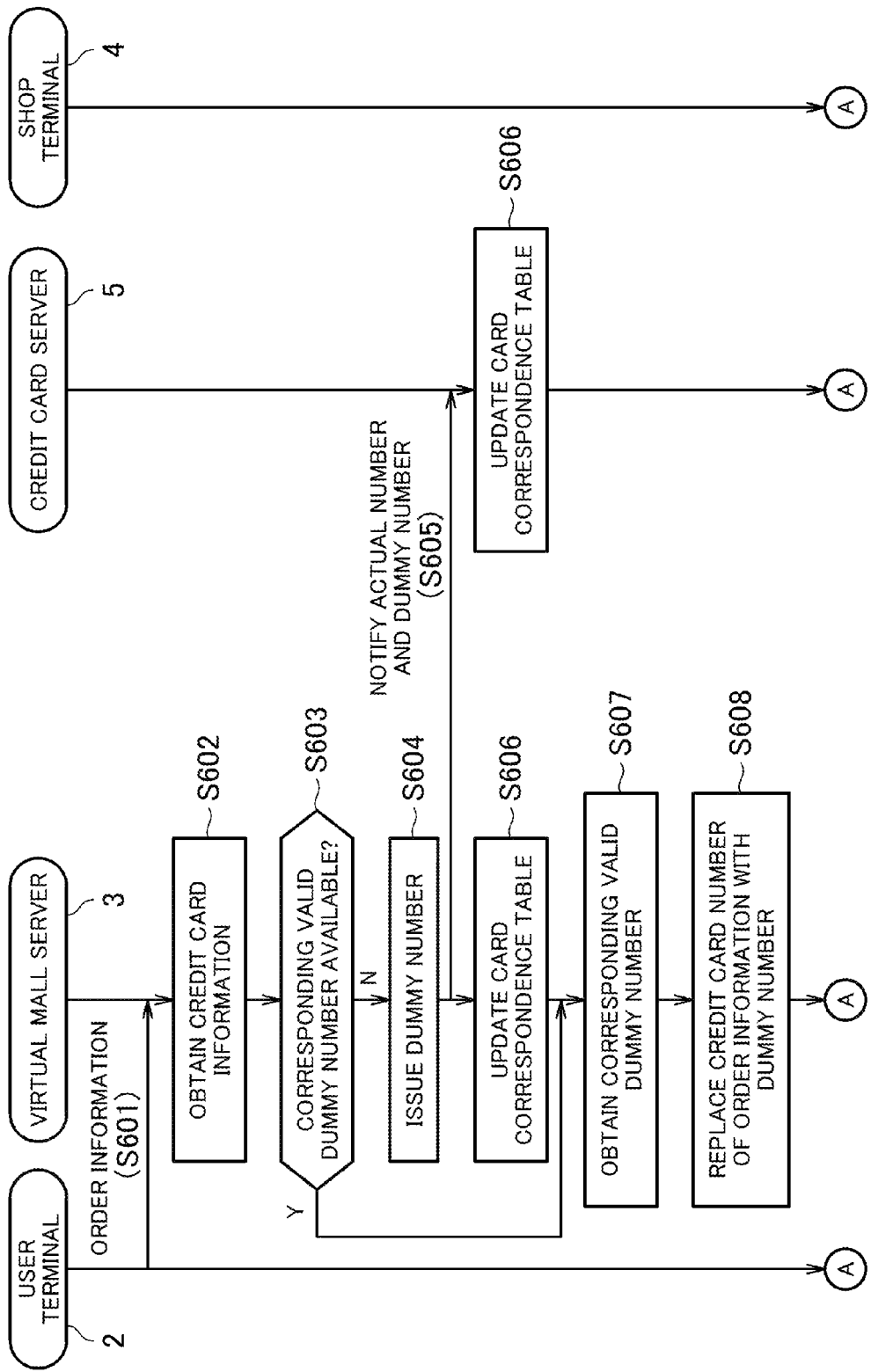

CREDIT CARD INFORMATION PROCESSING SYSTEM, CREDIT CARD INFORMATION PROCESSING METHOD, ORDER INFORMATION RECEIVING DEVICE, CREDIT CARD TRANSACTION DEVICE, PROGRAM, AND INFORMATION RECORDING MEDIUM

CROSS REFERENCE TO RELATED APPLICATIONS

This application is a National Stage of International Application No. PCT/JP2012/063801 filed May 29, 2012, claiming priority based on Japanese Patent Application No. 2011-146203 filed on Jun. 30, 2011. The contents of each of the above documents are incorporated herein by reference in their entirety.

TECHNICAL FIELD

The present invention relates to a credit card information processing system, a credit card information processing method, an order information receiving device, a credit card transaction device, a program, and an information recording medium.

BACKGROUND ART

There has been available an e-commerce system in which, through an online shopping site that constructs a virtual mall with a plurality of virtual shops on the Internet, goods can be purchased at a shop corresponding to each of the virtual shops. In this e-commerce system, when a user makes a credit card transaction upon the purchase of goods at a shop, a server of the virtual mall sends a credit card number of the user to a shop terminal so that the shop terminal sends a credit inquiry or a request for the settlement of the sales based on the credit card number of the user to a credit card company.

In a case where actual credit card numbers of the users are forwarded to the shop, the shop needs to bear enormous human and economic costs incurred in the management of the credit card numbers of the users. As such, as described in Patent Literature 1 below, there has been proposed a system in which an intermediary settlement system issues a virtual card number to a user in advance, and performs settlement process based on the virtual card number inputted at the time of the order.

CITATION LIST

Patent Document

Patent Literature 1: JP2002-298055A

SUMMARY OF INVENTION

Technical Problem

However, the above mentioned conventional art faces entry barriers, because a user needs to go through the procedures that are originally unnecessary to do, such as applying for issuance of a virtual card number prior to the purchase of goods and managing the issued virtual card number.

One or more embodiments of the present invention have been conceived in view of the above, and an object thereof is to provide a credit card information processing system, a credit card information processing method, an order information receiving device, a credit card transaction device, a program and an information recording medium capable of reducing a seller's workload of managing credit card information without changing the convenience for an orderer and the seller in a transaction using a credit card.

Solution to Problem

In order to solve the above described problems, a credit card information processing system according to the present invention includes an order information receiving device configured to receive order information for a shop from a user terminal and provide a shop terminal with the received order information, and a credit card transaction device configured to process a credit card transaction related to the order information. The order information receiving device includes dummy data obtaining means for obtaining dummy data corresponding to actual data of a credit card to be used for a settlement of the order information received from the user terminal, and sending means for sending the dummy data, as data of the credit card to be used for the settlement of the order information, to the shop terminal that processes the order information, the dummy data being obtained by the dummy data obtaining means. The credit card transaction device includes receiving means for receiving, from the shop terminal, a request for a credit card transaction based on the dummy data, actual data obtaining means for obtaining actual data corresponding to the received dummy data based on conversion information for converting between the actual data of the credit card and the dummy data of the credit card, the conversion information being shared with the order information receiving device, and processing means for processing the received request for the credit card transaction based on the actual data obtained by the actual data obtaining means.

In an embodiment of the present invention, in the credit card information processing system, the order information receiving device further includes actual data sending means for sending, to the credit card transaction device, the actual data of the credit card to be used for the settlement of the order information received from the user terminal. The credit card transaction device further includes generating means for generating the conversion information in which the actual data of the credit card is associated with the dummy data corresponding to the actual data, the actual data being sent from the actual data sending means. The order information receiving device further includes conversion information obtaining means for obtaining the conversion information generated by the generating means.

In an embodiment of the present invention, in the credit card information processing system, the order information receiving device further includes candidate obtaining means for obtaining one or more dummy data candidates issued by the credit card transaction device, and generating means for selecting dummy data from the one or more dummy data candidates obtained by the candidate obtain means, the dummy data corresponding to the actual data of the credit card to be used for the settlement of the order information received from the user terminal, and generating the conversion information in which the actual data of the credit card is associated with the selected dummy data. The credit card transaction device further includes conversion information obtaining means for obtaining the conversion information generated by the generating means.

In an embodiment of the present invention, in the credit card information processing system, the order information receiving device further includes requesting means for requesting the credit card transaction device to issue one or more new dummy data candidates in a case where a number of the dummy data candidates, which are obtained by the candidate obtaining means and are not associated with the actual data, is equal to or less than a threshold value. The candidate obtaining means obtains the one or more new dummy data candidates issued by the credit card transaction device in response to the request from the requesting means.

In an embodiment of the present invention, in the credit card information processing system, the requesting means requests for an issue of the one or more new dummy data candidates upon receiving order information from the user terminal.

In an embodiment of the present invention, in the credit card information processing system, at least one of the order information receiving device and the credit card transaction device further includes first determining means for determining whether or not to invalidate dummy data based on a result of evaluating a possibility of an improper use of the dummy data, the result being based on at least one of a number of times of use, an expiration date, a settlement amount relating to the order information, and accumulated settlement amounts, each relating to the dummy data obtained by the dummy data obtaining means, and updating means for updating the dummy data, which corresponds to actual data of the credit card to be used for the settlement of the order information, to new dummy data, in a case where the first determining means determines that the dummy data obtained by the dummy data obtaining means is invalid.

In an embodiment of the present invention, in the credit card information processing system, at least one of the order information receiving device and the credit card transaction device further includes second determining means for determining whether or not to invalidate dummy data based on a result of evaluating a possibility of a loss in a case where the dummy data leaks, the result being based on at least one of an expiration date and a credit card limit, each relating to the dummy data obtained by the dummy data obtaining means, and means for updating the dummy data, which corresponds to actual data of the credit card to be used for the settlement of the order information, to new dummy data, in a case where the second determining means determines that the dummy data of the credit card obtained by the dummy data obtaining means is invalid.

A credit card information processing method according to the present invention receives order information for a shop from a user terminal, provides a shop terminal with the received order information, and processes a credit card transaction related to the order information. The credit card information processing method includes the steps of obtaining dummy data corresponding to actual data of a credit card to be used for a settlement of the order information received from the user terminal, sending the dummy data, as data of the credit card to be used for the settlement of the order information, to the shop terminal that processes the order information, the dummy data being obtained in the step of obtaining the dummy data, receiving, from the shop terminal, a request for a credit card transaction based on the dummy data, obtaining actual data corresponding to the received dummy data based on conversion information for converting between the actual data of the credit card and the dummy data of the credit card, the conversion information being shared with an order information receiving device, and processing the received request for the credit card transaction based on the actual data obtained in the step of obtaining the actual data.

An order information receiving device according to the present invention receives order information for a shop from a user terminal and provides a shop terminal with the received order information. The order information receiving device includes dummy data obtaining means for obtaining dummy data corresponding to actual data of a credit card to be used for a settlement of the order information received from the user terminal, and sending means for sending the dummy data, as data of the credit card to be used for the settlement of the order information, to the shop terminal that processes the order information, the dummy data being obtained by the dummy data obtaining means.

A program according to the present invention causes a computer, which receives order information for a shop from a user terminal and provides a shop terminal with the received order information, to function as dummy data obtaining means for obtaining dummy data corresponding to actual data of a credit card to be used for a settlement of the order information received from the user terminal, and sending means for sending the dummy data, as data of the credit card to be used for the settlement of the order information, to the shop terminal that processes the order information, the dummy data being obtained by the dummy data obtaining means.

An information storage medium according to the present invention stores a program for causing a computer, which receives order information for a shop from a user terminal and provides a shop terminal with the received order information, to function as dummy data obtaining means for obtaining dummy data corresponding to actual data of a credit card to be used for a settlement of the order information received from the user terminal, and sending means for sending the dummy data, as data of the credit card to be used for the settlement of the order information, to the shop terminal that processes the order information, the dummy data being obtained by the dummy data obtaining means.

A credit card transaction device according to the present invention processes a credit card transaction related to order information received by an order information receiving device configured to receive order information for a shop from a user terminal and provide a shop terminal with the received order information. The order information receiving device includes dummy data obtaining means for obtaining dummy data corresponding to actual data of a credit card to be used for a settlement of the order information received from the user terminal, and sending means for sending the dummy data, as data of the credit card to be used for the settlement of the order information, to the shop terminal that processes the order information, the dummy data being obtained by the dummy data obtaining means. The credit card transaction device includes receiving means for receiving, from the shop terminal, a request for a credit card transaction based on the dummy data, actual data obtaining means for obtaining actual data corresponding to the received dummy data based on conversion information for converting between the actual data of the credit card and the dummy data of the credit card, the conversion information being shared with the order information receiving device, and processing means for processing the received request for the credit card transaction based on the actual data obtained by the actual data obtaining means.

A program according to the present invention causes a computer, which processes a credit card transaction related to order information received by an order information receiving device configured to receive order information for a shop from a user terminal, provide a shop terminal with the received order information, and include dummy data obtaining means for obtaining dummy data corresponding to actual data of a credit card to be used for a settlement of the order information received from the user terminal and sending means for sending the dummy data, as data of the credit card to be used for the settlement of the order information, to the shop terminal that processes the order information, the dummy data being obtained by the dummy data obtaining means, to function as receiving means for receiving, from the shop terminal, a request for a credit card transaction based on the dummy data, actual data obtaining means for obtaining actual data corresponding to the received dummy data based on conversion information for converting between the actual data of the credit card and the dummy data of the credit card, the conversion information being shared with the order information receiving device, and processing means for processing the received request for the credit card transaction based on the actual data obtained by the actual data obtaining means.

An information storage medium according to the present invention stores a program for causing a computer, which processes a credit card transaction related to order information received by an order information receiving device configured to receive order information for a shop from a user terminal, provide a shop terminal with the received order information, and comprise dummy data obtaining means for obtaining dummy data corresponding to actual data of a credit card to be used for a settlement of the order information received from the user terminal and sending means for sending the dummy data, as data of the credit card to be used for the settlement of the order information, to the shop terminal that processes the order information, the dummy data being obtained by the dummy data obtaining means, to function as receiving means for receiving, from the shop terminal, a request for a credit card transaction based on the dummy data, actual data obtaining means for obtaining actual data corresponding to the received dummy data based on conversion information for converting between the actual data of the credit card and the dummy data of the credit card, the conversion information being shared with the order information receiving device, and processing means for processing the received request for the credit card transaction based on the actual data obtained by the actual data obtaining means.

Advantageous Effects of Invention

According to an embodiment of the present invention, it is possible to reduce a seller's workload of managing credit card information without changing the convenience for an orderer and the seller in a transaction using a credit card.

BRIEF DESCRIPTION OF DRAWINGS

FIG. 2 A diagram illustrating an example of a hardware configuration of a virtual mall server and a credit card server.

FIG. 3 A diagram illustrating an example of a user information table.

FIG. 4 A diagram illustrating an example of a card correspondence table.

FIG. 5 A diagram illustrating an example of a credit card information table.

FIG. 6 A diagram illustrating an example of a dummy detail information table.

FIG. 9 A diagram illustrating an example of a dummy number stock table.

FIG. 11 A diagram illustrating a processing sequence of order information according to a second embodiment.

FIG. 12 A diagram illustrating a processing sequence of order information according to a third embodiment.

FIG. 13 A diagram illustrating a processing sequence of order information according to a fourth embodiment.

DESCRIPTION OF EMBODIMENTS

An embodiment of the present invention will be described below with reference to the accompanying drawings.

[1. System Configuration]

Figure 1:
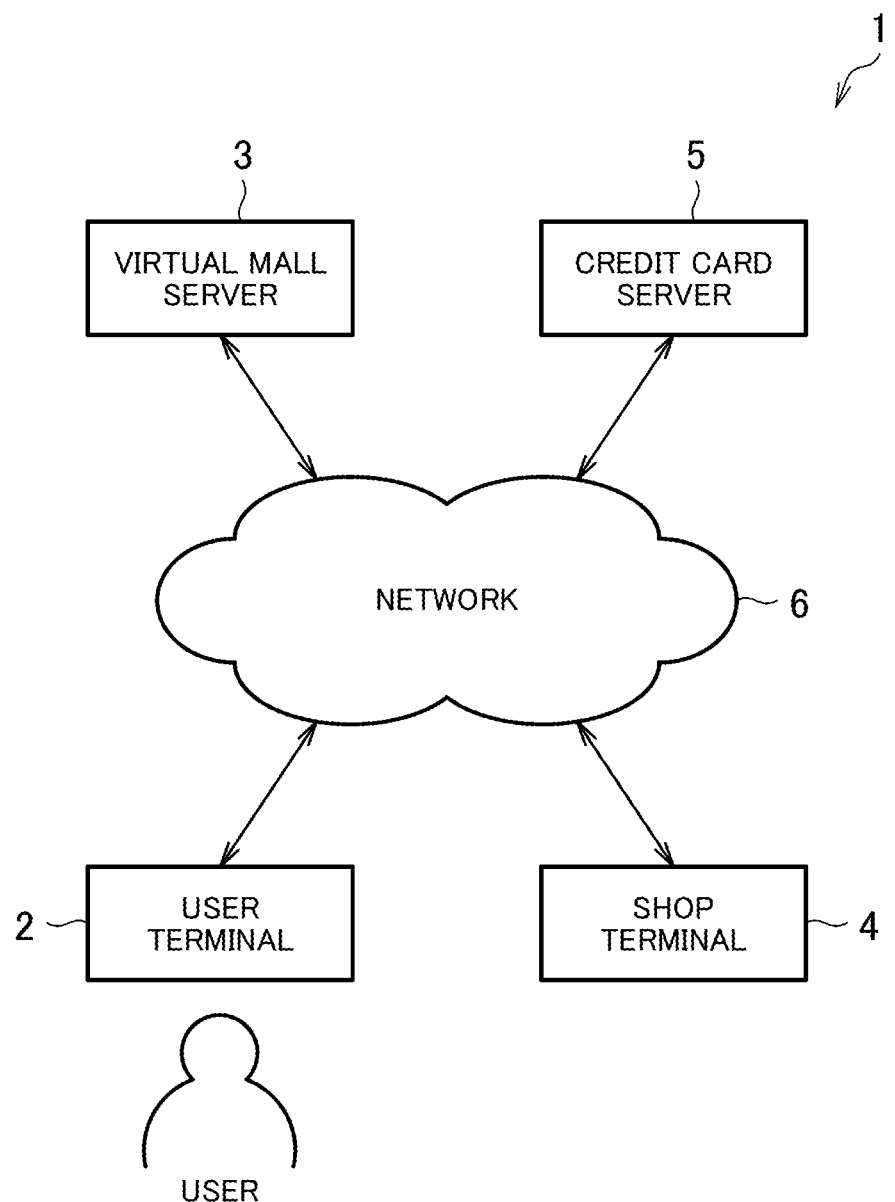
FIG. 1 A diagram illustrating an example of a system configuration of an e-commerce system.

FIG. 1 illustrates a system configuration of an e-commerce system 1 according to the present embodiment. As shown in FIG. 1, the e-commerce system 1 includes a user terminal 2, a virtual mall server 3, a shop terminal 4, and a credit card server 5, which are connected to each other via a network 6 such as the Internet so that data communication is available.

The user terminal 2 is a computer (e.g., personal computer, mobile information terminal, and mobile phone) including display means and communication means. For example, the user terminal 2 accesses the virtual mall server 3 via a web browser so as to browse or purchase goods for sale in a virtual shop opened in the virtual mall server 3. In this embodiment, a credit card transaction is performed using credit card information specified by a user for settlement of purchase of goods.

The virtual mall server 3 is a computer that provides a website of a virtual mall having a plurality of virtual shops and mediates communications between a user terminal 2 and a shop terminal 4 in each virtual shop at the time of processing settlement of purchase of goods. For example, the virtual mall server 3 receives order information for an item in a virtual shop from the user terminal 2, and sends the received order information to the shop terminal 4 corresponding to the virtual shop. At this time, the virtual mall server 3 according to this embodiment replaces user's credit card information (actual number) to be used at the time of purchasing the item with dummy credit card information (dummy number) and sends the order and the dummy credit card information to the shop terminal 4 so as not to give actual data of the credit card to the shop. The processing performed in the virtual mall server 3 will be explained in detail later.

The shop terminal 4 is a computer of a shop opened in the virtual mall server 3. For example, the shop terminal 4 receives order information and dummy credit card information for the shop from the virtual mall server 3, and sends, to the credit card server 5, a credit inquiry based on the received credit card information or a settlement request for the sales after the order is confirmed.

The credit card server 5 is a computer that manages user's credit card information and performs a credit inquiry specifying credit card information or a settlement request for the sales. In this embodiment, the credit card server 5 shares conversion information (e.g., card correspondence table indicative of correspondence between actual number and dummy number, and number conversion rule), which is used for obtaining corresponding dummy data (dummy number) of user's credit card from actual data (actual number) of the credit card, with the virtual mall server 3. When receiving a credit inquiry or a settlement request based on the dummy number from the shop terminal 4, the credit card server 5 obtains the actual number corresponding to the received dummy number, and processes the credit inquiry or sales registration based on the obtained actual number. The processing performed in the credit card server 5 will be also explained in detail later.

[2. Hardware Configuration]

FIG. 2 illustrates an example of hardware configuration of the virtual mall server 3 and the credit card server 5. In the following, a hardware configuration of each of the virtual mall server 3 and the credit card server 5 will be explained in order.

[2.1. Hardware Configuration of Virtual Mall Server 3]

The hardware configuration of the virtual mall server 3 will be explained below. As shown in FIG. 2, the virtual mall server 3 includes a control unit 30, a storage unit 32, and a communication unit 34, which are in data communication with one another via a bus 36.

The control unit 30, which includes a CPU (Central Processing Unit), executes various arithmetic processing based on programs or data stored in the storage unit 32 and controls each portion of the virtual mall server 3. A program processed in the control unit 30 may be provided to the virtual mall server 3 while being stored in an information recording medium, such as an optical disc, a magnetic disc, a magnetic tape, a magnetic optical disc, and a flash memory, or may be provided to the virtual mall server 3 via data communication means such as the Internet.

The storage unit 32 stores a program or data in which the processing executed in the virtual mall server 3 is written, and also is used as a work memory of the control unit 30. In the following, an example of data stored in the storage unit 32 will be explained.

FIG. 3 illustrates an example of a user information table stored in the storage unit 32. The user information table shown in FIG. 3 stores a user ID, a password, an e-mail address, and credit card information in association with one another. The credit card information is stored in the user information table only when it is pre-registered by a user, and is not necessarily required to be registered. The credit card information may include information about, for example, a credit card number, a cardholder's name, and an expiration date.

FIG. 4 illustrates an example of a card correspondence table stored in the storage unit 32. The card correspondence table shown in FIG. 4 stores an actual number and dummy number of a credit card, a user ID, a shop ID, and an invalid flag in association with one another. The dummy number corresponding to the actual number of the credit card may be issued by the virtual mall server 3, or issued by the credit card server 5. The dummy number may be constructed in a way that it is possible to determine whether or not the number is dummy based on the credit card number by setting a predetermined digit to be a specific number. FIG. 4 shows an example of setting the first number to be 0. In addition, the user ID and the shop ID, which are stored in the card correspondence table in association with the dummy number, may be the user ID and the shop ID relating to an order for which settlement was made using the dummy number. The invalid flag is a true-false value that indicates whether or not the dummy number of the credit card is invalid (unavailable). For example, when it is invalid, "true (T)" may be stored, and when it is not invalid, "false (F)" may be stored.

The communication unit 34 includes a network interface, and connects to the network 6 via the network interface to perform data communication with e.g., the user terminal 2, the shop terminal 4, and the credit card server 5, each of which is connected to the network 6.

[2.2. Hardware Configuration of Credit Card Server 5]

In the following, the hardware configuration of the credit card server 5 will be explained. As shown in FIG. 2, the credit card server 5 includes a control unit 50, a storage unit 52, and a communication unit 54, which are in data communication with one another via a bus 56.

The control unit 50, which includes a CPU (Central Processing Unit), executes various arithmetic processing based on programs or data stored in the storage unit 52 and controls each portion of the credit card server 5. A program processed in the control unit 50 may be provided to the credit card server 5 while being stored in an information recording medium, such as an optical disc, a magnetic disc, a magnetic tape, a magnetic optical disc, and a flash memory, or may be provided to the credit card server 5 via data communication means such as the Internet.

The storage unit 52 stores a program or data in which the processing executed in the credit card server 5 is written, and is also used as a work memory of the control unit 50. In the following, an example of data stored in the storage unit 52 will be explained.

FIG. 5 illustrates an example of a credit card information table stored in the storage unit 52. The credit card information table shown in FIG. 5 stores an actual number of a credit card, a credit line, available amounts, a cardholder, an expiration date, and information on an invalid flag in association with one another. The invalid flag is a true-false value that indicates whether or not the actual number of the credit card is invalid (unavailable). For example, when it is invalid, "true (T)" may be stored, and when it is not invalid, "false (F)" may be stored.

The storage unit 52 stores a card correspondence table. The card correspondence table stored in the storage unit 52 may be identical to the card correspondence table stored in the storage unit 32 of the virtual mall server 3, except that the card correspondence table stored in the storage unit 52 includes a member shop ID provided by the credit card server 5 to each shop instead of or together with a shop ID provided by the virtual mall server 3.

FIG. 6 illustrates an example of a dummy detail information table relating to a dummy number of a credit card stored in the storage unit 52. The dummy detail information table shown in FIG. 6 stores a dummy number of a credit card, an expiration date of the dummy number, and a usage history in association with one another. For example, information about the usage history may include a date of use and a used amount (settlement amount) of the dummy number.

The communication unit 54 includes a network interface and connects to the network 6 via the network interface to perform data communication with e.g., the user terminal 2, the shop terminal 4, and the virtual mall server 3, each of which is connected to the network 6.

[3. Sequence]

The following will explain examples of sequence (first-forth embodiments) in the e-commerce system 1 relating to processing of an order information, which is received by the virtual mall server 3 from the user terminal 2, and credit card transaction processing relating to the order information.

[3.1. First Embodiment]

Figure 7:
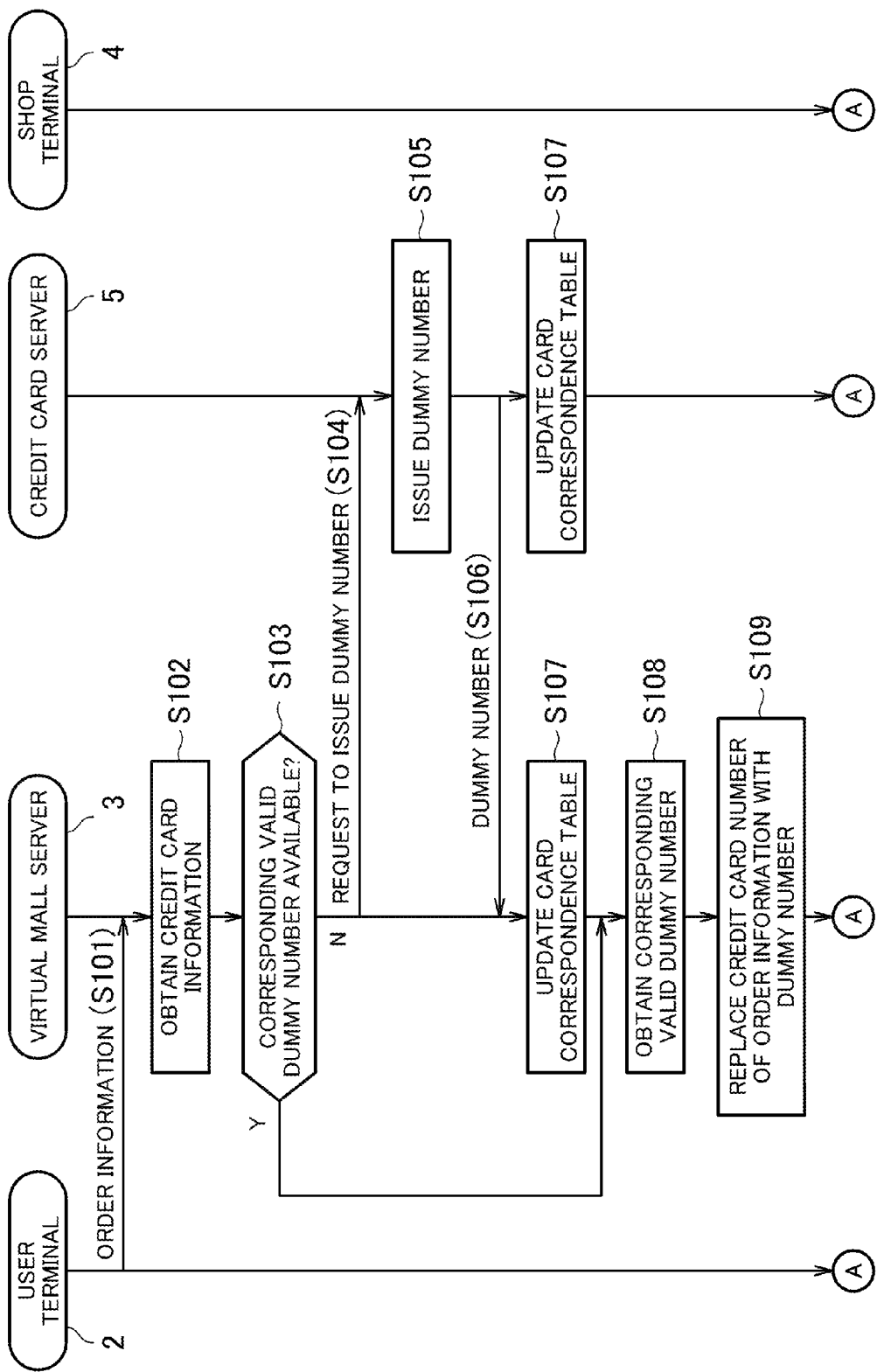
FIG. 7 A diagram illustrating a processing sequence of order information according to a first embodiment.

FIG. 7 illustrates a sequence diagram showing the first embodiment performed in the e-commerce system 1.

After logging in the virtual mall server 3, the user terminal 2 inputs necessary information into an item purchase page of a virtual shop obtained from the virtual mall server 3, and sends order information to the virtual mall server 3 (S101). The order information includes, for example, a user ID, a shop ID, an item ID, an item quantity, and information for specifying settlement. For example, the information for specifying settlement may include credit card information about a credit card to use, or user information for specifying credit card information stored in the user information table in association with the user ID.

Based on the order information received from the user terminal 2, the virtual mall server 3 obtains credit card information to be used in a settlement of the order information (S102).

The virtual mall server 3 determines whether or not the card correspondence table stored in the storage unit 32 includes a valid (not invalidated) dummy number corresponding to a card number (actual number) of the credit card information obtained in S102 (S103). In this regard, if the virtual mall server 3 determines there is no valid dummy number corresponding to the actual number of the credit card (S103:N), the virtual mall server 3 requests the credit card server 5 to issue a dummy number corresponding to the actual number of the credit card (S104).

The credit card server 5 issues a dummy number corresponding to the actual number of the credit card requested by the virtual mall server 3 (S105), and sends the issued dummy number to the virtual mall server 3 (S106). An expiration date may be set to the issued dummy number.

The virtual mall server 3 and the credit card server 5 respectively update the card correspondence tables based on the actual number of the credit card and the dummy number issued in regard to the actual number (S107).

The virtual mall server 3 obtains, upon determining that there is a valid dummy number in S103 (S103:Y) or after S107, the valid dummy number corresponding to the actual number from card correspondence table (S108). Subsequently, the virtual mall server 3 replaces the credit card number to be used for the settlement of the order information received in S101 with the dummy number obtained in S108 (S109), and notifies the shop of the received order information. The following describes, referring to a sequence diagram shown in FIG. 8, the steps of the processing performed in the e-commerce system 1 after replacing the credit card number to be used in the settlement of the order information with the dummy number.

Figure 8:
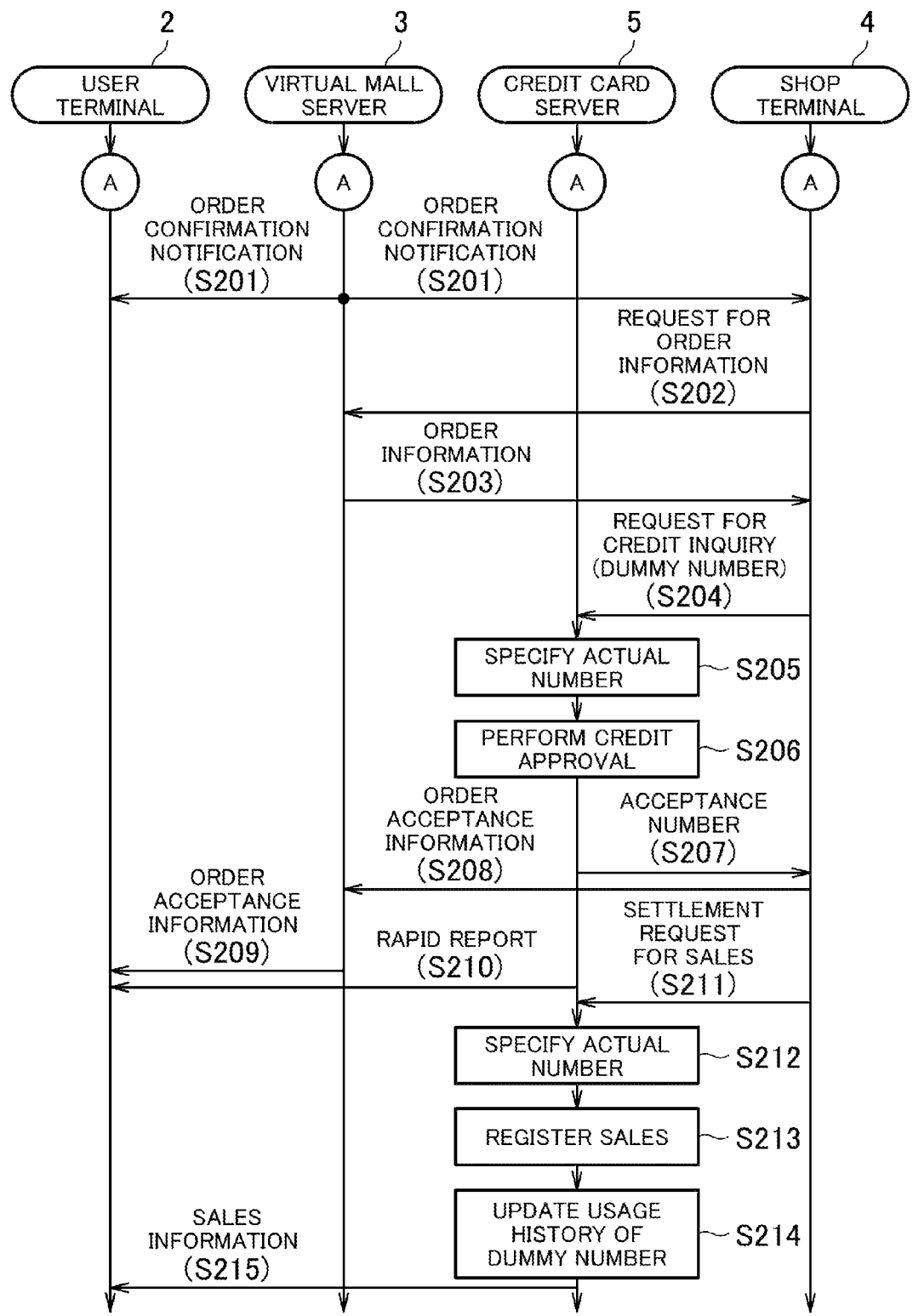
FIG. 8 A diagram illustrating a sequence indicating processing performed in the e-commerce system after replacing a credit card number to be used in a settlement of order information with a dummy number.

As shown in FIG. 8, the virtual mall server 3 sends an order confirmation notification (order confirmation mail) to the shop terminal 4 and the user terminal 2 (S201). Subsequently, upon receiving a request from the user terminal 2 to send order information (S202), the virtual mall server 3 sends the order information relating to the received request to the shop terminal 4 (S203).

The shop terminal 4 sends a credit inquiry request based on a settlement amount calculated according to the order information received from the virtual mall server 3 and the credit card number (dummy number) included in the order information to the credit card server 5 (S204).

The credit card server 5 specifies, based on the card correspondence table, an actual number corresponding to the dummy number of the credit card relating to the received credit inquiry request (S205). In this regard, the credit card server 5 may determine whether or not the credit card number relating to the received credit inquiry request is a dummy number, and when the credit card number is determined to be a dummy number, the credit card server 5 may set the actual number corresponding to the dummy number as a target of a credit inquiry. When the credit card number is determined not to be a dummy number (i.e., determined to be an actual number), the credit card server 5 may directly set the credit card number as a target of a credit inquiry. Whether or not the target credit card number is a dummy number may be determined based on, for example, if the target credit card number is assumed to be a dummy number, whether or not an actual number corresponding to the assumed dummy number is obtained. Alternatively, it may be determined based on, when the dummy number is configured to have the predetermined characteristics (e.g., a predetermined digit of the dummy number is a specified number, or a parity value of the dummy number is a predetermined value), whether or not the credit card number has the predetermined characteristics relating to the credit inquiry request. In this regard, if the target credit card number is assumed to be a dummy number, whether or not the corresponding actual number can be obtained may be determined by, for example, when the replacement of the actual number with the dummy number of the credit card is based on the card correspondence table, searching whether or not a column of the dummy number includes a record storing the target credit card number. Alternatively, when the replacement of the actual number with the dummy number of the credit card is based on a predetermined conversion rule, it may be determined by whether or not the credit card information table includes the card number obtained by converting the target credit card number under the predetermined conversion rule.

The credit card server 5 performs credit approval based on whether or not available amounts associated with the specified actual number is the settlement amount or more (S206), and sends the result (acceptance number) to the shop terminal 4 (S207). In a case where a member shop ID (ID given by the credit card server 5 to each shop) indicative of the shop that has sent the credit inquiry request does not correspond to the dummy number relating to the credit inquiry request in the card correspondence table of the storage unit 52, the credit card server 5 may disapprove the credit immediately without comparing and determining the available amounts and the settlement amount. In this example of the sequence, the description continues assuming that the credit is accepted.

Upon receiving the credit approval from the credit card server 5, the shop terminal 4 notifies the virtual mall server 3 of order acceptance information (S208). Subsequently, upon receiving the order acceptance information from the shop terminal 4, the virtual mall server 3 sends an order acceptance mail to a user's e-mail address (user terminal 2) (S209).

The credit card server 5 sends, at a predetermined timing after the credit inquiry, information about rapid report of sales (e.g., date of use and used amount) based on the credit inquiry relating to the actual number of the credit card to the user's e-mail address (user terminal 2) (S210).

The shop terminal 4 sends a settlement request for the sales based on the credit card number (dummy number) and the acceptance number to the credit card server 5 at a predetermined settlement request timing (S211). The credit card server 5 specifies, from the card correspondence table, an actual number corresponding to the dummy number of the credit card relating to the settlement request (S212), and registers the settlement amount associated with the acceptance number as the sales relating to the specified actual number (S213). Further, the credit card server 5 updates a dummy detail information table based on a usage history (date of use and settlement amount) of the dummy number received from the shop terminal 4 (S214).

The credit card server 5 sends sales information (e.g., date of use, used amount, scheduled billing month, payment method, shop of purchase), which is based on the sales registered in relation to the actual number of the credit card, to the user's e-mail address (user terminal 2) at the predetermined timing after the sales are registered (S215). The mentioned above describes the steps of the processing according to the first embodiment. The virtual mall server 3 may perform the sequences shown in FIGS. 7 and 8 each time when receiving order information from the user terminal 2.

According to the processing of the first embodiment as mentioned above, since actual data of a user's credit card is not sent to the shop terminal 4, it is possible to prevent the shop from leaking the actual data of the credit card. In addition, the shop can reduce human and economic costs required for managing actual data of the user's credit card. If by any chance the shop leaks credit card information, since the leaked credit card information is dummy data, it is only necessary to invalidate the dummy data and not necessary to invalidate or reissue the actual data of the credit card. In addition, since the user does not need to take special processing to use a dummy number, and the user terminal 2 and the shop terminal 4 do not require specific system change, it is possible to easily introduce the system into the existing environment. Further, a dummy number corresponding to an actual number of a credit card is issued as necessary, and thus it is possible to reduce the number of dummy numbers to be distributed, risk of information leak, and storage capacity required for managing dummy numbers.

[3.2. Second Embodiment]

In the following, a sequence according to the second embodiment of the e-commerce system 1 will be explained. The sequence according to the second embodiment is different from that of the first embodiment in that the virtual mall server 3 obtains in advance a candidate of a dummy number of a credit card issued by the credit card server 5, stores the obtained dummy number candidate in a dummy number stock table (see FIG. 9) provided to the storage unit 32, and selects a dummy number to be corresponding to an actual number of the credit card among from the stored dummy number candidates.

FIG. 9 illustrates an example of the dummy number stock table stored in the storage unit 32. As shown in FIG. 9(A), the dummy number stock table may, for example, store a candidate of a dummy number and a used flag (true-false value) in association with each other, and update a utilization availability flag of the dummy number associated with the actual number of the credit card as being not available (for example, false). In addition, as shown in FIG. 9(B), the dummy number stock table may store only a dummy number that is not associated with an actual number of a credit card, and remove a dummy number that is associated with an actual number of a credit card therefrom.

Figure 10:
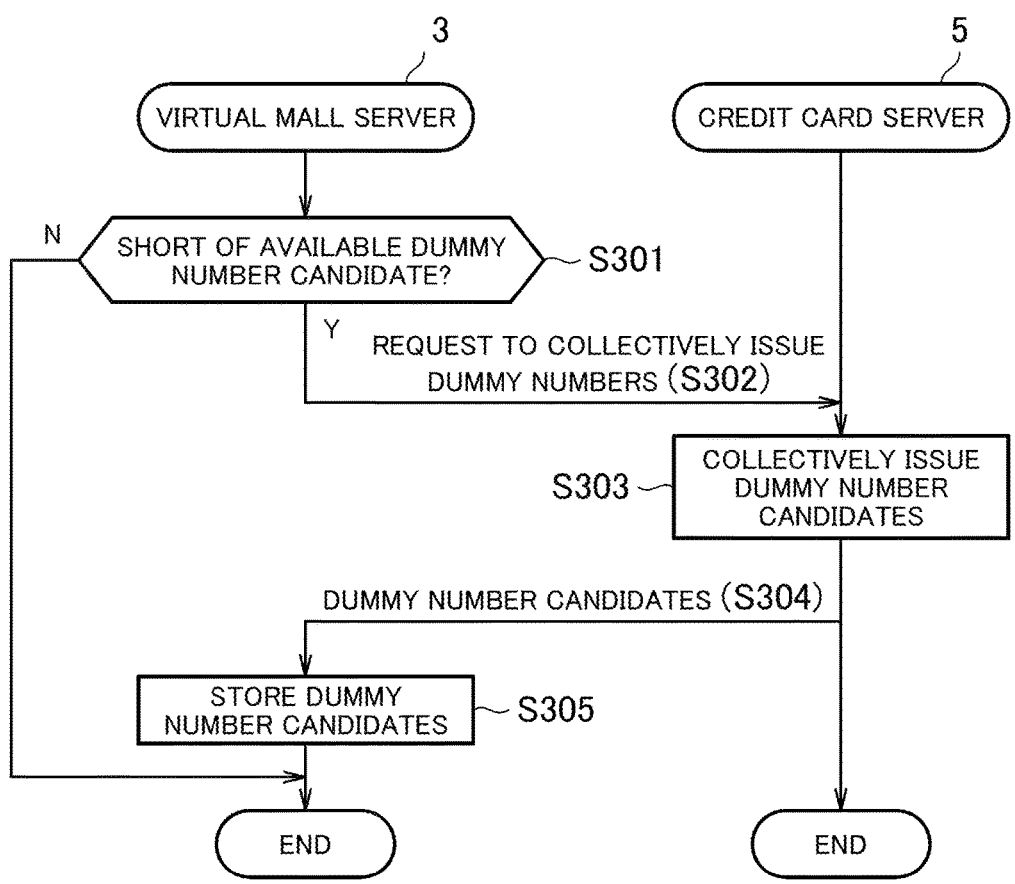
FIG. 10 A diagram illustrating a sequence relating to supplement processing of a dummy number candidate.

FIG. 10 illustrates a sequence diagram showing supplement processing of a candidate of a dummy number. As shown in FIG. 10, the virtual mall server 3 refers to the dummy number stock table (see FIG. 9) to determine whether or not candidates of available dummy numbers fall short (e.g., whether or not the number of available dummy number candidates is equal to or less than a threshold value (e.g., 100)) (S301). If it is determined that there are not enough dummy number candidates (S301:Y), the virtual mall server 3 requests the credit card server 5 to collectively issue dummy numbers (S302). If it is determined that there are enough candidates of the available dummy numbers (S301:N), the virtual mall server 3 may finish the processing.

Upon receiving a request to issue the dummy number from the virtual mall server 3, the credit card server 5 collectively issues candidates of new dummy numbers (S303), and sends the issued dummy number candidates to the virtual mall server 3 (S304).

Subsequently, upon receiving the dummy number candidates from the credit card server 5, the virtual mall server 3 stores the received dummy number candidates in the dummy number stock table (S305), and finishes the processing. The supplement processing of the dummy number candidates may be performed in a predetermined interval or each time when a dummy number is selected from the dummy number stock table.

Next, referring to a sequence diagram shown in FIG. 11, a processing sequence of order information according to the second embodiment will be explained.

After logging-in the virtual mall server 3, the user terminal 2 inputs required details in an item purchase page of a virtual shop obtained from the virtual mall server 3, and sends order information to the virtual mall server 3 (S401). The order information includes, for example, a user ID, a shop ID, an item ID, item quantity, and settlement specifying information. For example, the settlement specifying information may include information about a credit card to use, or information for specifying credit card information stored in the user information table in association with the user ID.

The virtual mall server 3 obtains, based on the order information received from the user terminal 2, credit card information to be used for settlement of the order information (S402).

The virtual mall server 3 determines whether or not the card correspondence table stored in the storage unit 32 includes a valid (not invalidated) dummy number corresponding to the card number (actual number) of the credit card information obtained in S401 (S403).

If it is determined that a valid dummy number is not available in S403 (S403N), the virtual mall server 3 selects an available dummy number from the dummy number stock table, for example, in a random manner or under a certain rule (S404), associates an actual number of the credit card with the selected dummy number, and updates the card correspondence table of the storage unit 32 (S405). Subsequently, the virtual mall server 3 updates the dummy number stock table (S406). In this regard, if the dummy number stock table is in the form shown in FIG. 9(A), the virtual mall server 3 updates the utilization availability flag corresponding to the selected dummy number as being not available, and if the dummy number stock table is in the form shown in FIG. 9(B), the virtual mall server 3 removes the selected dummy number from the table. The virtual mall server 3 also notifies the credit card server 5 of information about an association between the actual number and the dummy number of the credit card (S407).

The credit card server 5 associates the actual number with the dummy number of the credit card notified by the virtual mall server 3 and updates the card correspondence table of the storage unit 52 (S408).

The virtual mall server 3 obtains, if it is determined that there is a valid dummy number in S403 (S403:Y) or after S407, the valid dummy number corresponding to the actual number from card correspondence table (S409). Subsequently, the virtual mall server 3 replaces the credit card number to be used for the settlement of the order information received in S401 with the dummy number obtained in S409 (S410), and notifies the shop of the received order information. In the following, the processing performed in the e-commerce system 1 after notifying the received order information to the shop is shown in the sequence diagram of FIG. 8 and is the same as in the first embodiment, and thus no explanation will be given. The mentioned above describes the steps of the processing of order information according to the second embodiment. The virtual mall server 3 may perform the sequences shown in FIGS. 11 and 8 each time when receiving order information from the user terminal 2.

According to the processing in the second embodiment as explained above, the virtual mall server 3 obtains in advance candidates of the dummy numbers issued collectively by the credit card server 5. Thus, compared to the first embodiment, it is possible to reduce processing load and processing time required for the virtual mall server 3 to receive order information from the user terminal 2 and replace the credit card information with dummy information.

[3.3. Third Embodiment]

In the following, a sequence according to the third embodiment of the e-commerce system 1 will be explained. The third embodiment is different from the second embodiment in that, after the virtual mall server 3 receives order information, dummy numbers are supplied as necessary. The sequence according to the third embodiment will be explained in detail below.

FIG. 12 illustrates a sequence diagram according to the third embodiment. After logging-in the virtual mall server 3, the user terminal 2 inputs required details in an item purchase page of a virtual shop obtained from the virtual mall server 3, and sends order information to the virtual mall server 3 (S501). The order information includes, for example, a user ID, a shop ID, an item ID, item quantity, and settlement specifying information. For example, the settlement specifying information may include information about a credit card to use, or information for specifying credit card information stored in the user information table in association with the user ID.

The virtual mall server 3 obtains, based on order information received from the user terminal 2, credit card information to be used for settlement of the order information (S502).

The virtual mall server 3 determines whether or not the card correspondence table stored in the storage unit 32 includes a valid (not invalidated) dummy number corresponding to the card number (actual number) of the credit card information obtained in S501 (S503).

If it is determined that there is no valid dummy number in S503 (S503:N), the virtual mall server 3 refers to the dummy number stock table to determine whether or not candidates of available dummy numbers fall short (e.g., whether or not the number of available dummy number candidates is equal to or less than a threshold value) (S504). If it is determined that there are not enough dummy number candidates (S504:Y), the virtual mall server 3 requests the credit card server 5 to issue dummy numbers (S505).

Upon receiving a request to issue the dummy number from the virtual mall server 3, the credit card server 5 collectively issues candidates of new dummy numbers (S506), and sends the issued dummy number candidates to the virtual mall server 3 (S507).

Subsequently, upon receiving the dummy number candidates from the credit card server 5, the virtual mall server 3 stores the received dummy number candidates in the dummy number stock table (S508).

If it is determined that there are enough available dummy number candidates (S504:N), or after S508, the virtual mall server 3 selects a dummy number to be associated with an actual number of the credit card from the dummy number stock table (S509), and associates an actual number of the credit card with the selected dummy number to update the card correspondence table (S510). Subsequently, the virtual mall server 3 updates the dummy number stock table based on the selected dummy number (S511). In this regard, if the dummy number stock table is in the form shown in FIG. 9(A), the virtual mall server 3 updates the utilization availability flag corresponding to the selected dummy number as being not available, and if the dummy number stock table is in the form shown in FIG. 9(B), the virtual mall server 3 removes the selected dummy number from the table. The virtual mall server 3 also notifies the credit card server 5 of information about an association between the actual number and the dummy number of the credit card (S512).

The credit card server 5 associates the actual number with the dummy number of the credit card notified by the virtual mall server 3 and updates the card correspondence table stored in the storage unit 52 (S513).

The virtual mall server 3 obtains, upon determining that there is a valid dummy number in S503 (S503:Y) or after S512, the valid dummy number corresponding to the actual number from card correspondence table (S514). Subsequently, the virtual mall server 3 replaces the credit card number to be used for the settlement of the order information received in S501 with the dummy number obtained in S514 (S515), and notifies the shop of the received order information. In the following, the processing performed in the e-commerce system 1 after notifying the shop of the received order information is shown in the sequence diagram of FIG. 8 and is the same as in the first embodiment, and thus no explanation will be given. The mentioned above describes the steps of the processing of order information according to the third embodiment. The virtual mall server 3 may perform the sequences shown in FIG. 12 each time when receiving order information from the user terminal 2.

According to the processing in the third embodiment as explained above, the virtual mall server 3 obtains in advance candidates of the dummy numbers issued collectively by the credit card server 5. Thus, if there are remaining dummy numbers obtained in advance, compared to the first embodiment, it is possible to reduce processing load and processing time required for the virtual mall server 3 to receive order information from the user terminal 2 and replace the credit card information with dummy information. In addition, the dummy numbers are supplied as necessary after receiving order information from the user terminal 2, and thus, it is possible to reduce risk of leaking dummy numbers compared to the second embodiment.

[3.4. Fourth Embodiment]

In the following, a sequence according to fourth embodiment of the e-commerce system 1 will be explained. The fourth embodiment is different from the first embodiment in that the virtual mall server 3 issues a dummy number of a credit card. The sequence according to the fourth embodiment will be explained in detail below.

FIG. 13 illustrates a sequence diagram according to the fourth embodiment. After logging-in the virtual mall server 3, the user terminal 2 inputs required details in an item purchase page of a virtual shop obtained from the virtual mall server 3, and sends order information to the virtual mall server 3 (S601). The order information includes, for example, a user ID, a shop ID, an item ID, item quantity, and settlement specifying information. For example, the settlement specifying information may include information about a credit card to use, or information for specifying credit card information stored in the user information table in association with the user ID.

The virtual mall server 3 obtains, based on order information received from the user terminal 2, credit card information to be used for settlement of the order information (S602).

The virtual mall server 3 determines whether or not the card correspondence table stored in the storage unit 32 includes a valid (not invalidated) dummy number corresponding to the card number (actual number) of the credit card information obtained in S602 (S603).

If it is determined that there is no valid dummy number corresponding to an actual number of a credit card (S603:N), the virtual mall server 3 issues a dummy number corresponding to the actual number of the credit card (S604). Subsequently, the virtual mall server 3 notifies the credit card server 5 of the dummy number corresponding to the actual number of the credit card (S605). The virtual mall server 3 and the credit card server 5 update respective card correspondence tables based on the dummy number issued for the actual number of the credit card (S606).

The virtual mall server 3 obtains, upon determining that there is a valid dummy number in S603 (S603:Y) or after S606, the valid dummy number corresponding to the actual number from the card correspondence table (S607). Subsequently, the virtual mall server 3 replaces the credit card number to be used for the settlement of the order information received in S601 with the dummy number obtained in S607 (S608), and notifies the shop of the received order information. In the following, the processing performed in the e-commerce system 1 after notifying the shop of the received order information is shown in the sequence diagram of FIG. 8 and is the same as in the first embodiment, and thus no explanation will be given. The mentioned above describes the steps of the processing of order information according to the fourth embodiment. The virtual mall server 3 may perform the sequences shown in FIG. 13 each time when receiving order information from the user terminal 2.

According to the fourth embodiment as explained above, the virtual mall server 3 issues a dummy number of a credit card and thus does not need to obtain a dummy number corresponding to an actual number of a credit card from the credit card server 5. Thus, compared to the first embodiment, it is possible to reduce processing load and processing time.

In the above mentioned embodiment, in a case where the virtual mall server 3 and the credit card server 5 share a function or a conversion rule enabling a reversible conversion of an actual number and a dummy number of a credit card, and the dummy number corresponding to the actual number of the credit card is issued based on the function or the conversion rule, the processing in S606 and S607 may be omitted. In this case, there is no need to transfer an actual number or a dummy number between the virtual mall server 3 and the credit card server 5, and thus it is possible to further reduce communication load and risk of information leak.

[4. Invalidation Processing of Dummy Number]

In the above embodiments, a dummy number associated with an actual number of a credit card may be fixed and not be updated. However, preferably, the dummy number is invalidated (abandoned) and an association between the actual number and the dummy number of the credit card is updated in order to reduce the risk at the time when the dummy number leaks. In the following, the invalidation processing of the dummy number will be explained.

For example, a dummy number associated with an actual number of a credit card may be invalidated each time when an order is completed. In this case, for example, the credit card server 5 may update an invalid flag of the dummy number to be true (invalid) after a sale of the order approved with respect to the dummy number is registered. When invalidating a dummy number, the credit card server 5 may notify the virtual mall server 3 of information about the invalidated dummy number. The virtual mall server 3 that has received the notification may also update the invalid flag of the dummy number to be true (invalid). In this way, if a dummy number corresponding to an actual number of a credit card is updated for each order, the dummy number of the credit card sent to a shop will not be used in other orders. Thus, it is possible to reduce the risk at the time when the dummy number has leaked.

Alternatively, a dummy number may be invalidated when the usage conditions of the dummy number associated with an actual number of a credit card satisfy predetermined invalidation conditions. In this way, it is possible to reduce processing load required for issuing and managing dummy numbers compared to a case where a dummy number is invalidated for each order. For example, the credit card server 5 and the virtual mall server 3 may obtain, based on usage history of a dummy number or order information that has been received already, values such as accumulated number of times of using the dummy number, a period of use of the dummy number, an used amount relating to the received order, accumulated used amounts, and frequency of use. The credit card server 5 and the virtual mall server 3 then may determine whether or not to invalidate the dummy number based on whether or not an invalidation condition of at least one of the values has been satisfied. For example, the invalidation condition may be described as at least one of or a combination of the followings: when the accumulated number of times of using dummy number is equal to or more than the first threshold value (or more than the first threshold value); when the period of use of the dummy number is equal to or more than the second threshold value (or more than the second threshold value); when the used amount of the received order is equal to or more than the third threshold value (or more than the third threshold value); when the accumulated used amounts is equal to or more than the fourth threshold value (or more than the fourth threshold value); and when the frequency of use (number of times of using the dummy number per unit time) is equal to or more than the fifth threshold value (or more than the fifth threshold value). In this regard, a magnitude of each threshold value may be determined according to a credit card limit of the card relating to the dummy number. For example, when the credit line (credit card limit) of the card is greater, it is more likely that the trouble when information leaks will increase. In view of this, a magnitude of each threshold value may be set low in proportion to the amount of the credit line so as to increase frequency by which the dummy number is updated.

The credit card server and the virtual mall server 3 may evaluate a risk when a dummy number has leaked or a possibility of improper use of the dummy number based on values such as accumulated number of times of using the dummy number, a period of use of the dummy number, the latest used amount, accumulated used amounts, frequency of use, and an expiration date and credit line (credit card limit) of the credit card relating to the corresponding actual number, and determine that the dummy number is invalid when the evaluation result is equal to or more than a predetermined level (or more than the predetermined level). For example, the level of the risk at the time when the dummy number has leaked may be evaluated to be greater when the valid period of the card is longer and the credit card limit of the card is higher. The level of the possibility of improper use of the dummy number may be evaluated to be higher when, for example, the values of accumulated number of times of using the dummy number, period of use of the dummy number, the latest used amount, accumulated used amounts, frequency of use are greater.

Whether or not to invalidate the dummy number may be determined at predetermined time intervals, or at times, for example, after the virtual mall server 3 receives order information from the user terminal 2, after the credit card server 5 registers sale of order information, and after predetermined time has passed since the previous determining timing.

In the above embodiments, a different dummy number may be associated with each actual number of a credit card, or the same dummy number may be associated with a plurality of actual numbers when an actual number of a credit card is determined uniquely for a pair of a dummy number and a user (user ID or cardholder).

The present invention is of course not to be limited to the above described embodiments. The virtual mall server and the credit card server may be configured as a single server, or each server may include a plurality of servers.

The invention claimed is:

1. A credit card information processing system, comprising:
   a virtual mall server, which holds conversion information and is configured to receive order information for a shop from a user terminal and provide a shop terminal with the received order information; and
   a credit card server, which holds a copy of the conversion information and is configured to process a credit card transaction related to the order information,
   wherein the virtual mail server comprises:
      a central processing device; and
      a memory storing programming information causing the central processing unit to be configured to:
         receive the order Information including actual data of a credit card sent from the user terminal in a processing of the order information and a credit card transaction processing relating to the order information;
         convert the actual data of the credit card included in the order information to dummy data corresponding to the actual data of the credit card based on the conversion information, in response to receiving the order information which includes the actual data of the credit card; and
         send the dummy data, as data of the credit card, to the shop terminal that processes the order information,
   wherein the credit card server comprises:
      a central processing unit; and
      a memory storing programming information causing the central processing unit to be configured to:
         receiving, from the shop terminal, a request for the credit card transaction based on the dummy data;
         obtain actual data corresponding to the received dummy data by using the copy of the conversion information to convert between the dummy data and the actual data of the credit card without accessing the conversion information held by the virtual mall server; and
         process the received request for the credit card transaction based on the obtained actual data.

2. The credit card information processing system according to claim 1,
   wherein the processor comprised in the virtual mall server is further configured to send, to the credit card server, the actual data of the credit card to be used for the settlement of the order information received from the user terminal,
   wherein the processor comprised in the credit card server is further configured to generate the conversion information in which the actual data of the credit card is associated with the dummy data corresponding to the actual data, the actual data being sent from the virtual mall server, and
   wherein the processor comprised in the virtual mall server is further configured to obtain the generated conversion information.

3. The credit card information processing system according to claim 1,
   wherein the processor comprised in the virtual mall server is further configured to:
      obtain one or more dummy data candidates issued by the credit card server; and
      select dummy data from the one or more obtained dummy data candidates, the dummy data corresponding to the actual data of the credit card to be used for the settlement of the order information received from the user terminal, and generate the conversion information in which the actual data of the credit card is associated with the selected dummy data, and
   wherein the processor comprised in the credit card server is further configured to obtain the generated conversion information.

4. The credit card information processing system according to claim 3,
   wherein the processor comprised in the virtual mall server is further configured to request the credit card server to issue one or more new dummy data candidates in a case where a number of the dummy data candidates, which are obtained and are not associated with the actual data, is equal to or less than a threshold value, and
   wherein the processor comprised in the virtual mall server is further configured to obtain the one or more new dummy data candidates issued by the credit card server in response to the request from the virtual mall server.

5. The credit card information processing system according to claim 4, wherein the processor comprised in the virtual mall server is further configured to request an issuance of the one or more new dummy data candidates upon receiving order information from the user terminal.

6. The credit card information processing system according to claim 1, wherein at least one of the processor comprised in the virtual mall server and the processor comprised in the credit card server is further configured to:
   determine whether or not to invalidate dummy data based on a result of evaluating a possibility of an improper use of the dummy data, the result being based on at least one of a number of times of use, an expiration date, a settlement amount relating to the order information, and accumulated settlement amounts, each relating to the obtained dummy data; and update the dummy data, which corresponds to actual data of the credit card to be used for the settlement of the order information, to new dummy data, in a case where it is determined that the obtained dummy data is invalid.

7. The credit card information processing system according to claim 1, wherein at least one of the processor comprised in the virtual mall server and the processor comprised in the credit card server is further configured to:

determine whether or not to invalidate dummy data based on a result of evaluating a possibility of a loss in a case where the dummy data leaks, the result being based on at least one of an expiration date and a credit card limit, each relating to the obtained dummy data; and update the dummy data, which corresponds to actual data of the credit card to be used for the settlement of the order information, to new dummy data, in a case where it is determined that the dummy data of the obtained credit card is invalid.

8. The credit card information processing system according to claim 1, wherein said conversion information is a card correspondence table.

* * * * *